Patented July 25, 1950

2,516,404

UNITED STATES PATENT OFFICE 2,516,404

REACTION PRODUCT OF HEXACHLORO-CYCLOPENTADIENE AND CHLORSULFONIC ACID

Earl T. McBee and Jack S. Newcomer, West Lafayette, Ind., assignors to Purdue Research Foundation, La Fayette, Ind., a corporation of Indiana No Drawing. Application January 9, 1948, Serial No. 1,486

7 Claims. (Cl. 260—1)

The present invention relates to a novel composition of matter, the compound of the molecular formula $C_{10}H_2O_3SCl_{12}$, and to a method for the preparation thereof by the reaction of chlorosulfonic acid and hexachlorocyclopentadiene. The new compound, having the approximate molecular formula $C_{10}H_2O_3SCl_{12}$, is a powerful insecticide, showing exceptional activity against the milkweed bug and the sweet potato weevil as well as other undesirable insects.

It is an object of the present invention to provide a novel composition of matter, the compound having the approximate formula $C_{10}H_2O_3SCl_{12}$. Another object of the present invention is the provision of a process for the preparation of the novel compound of the approximate formula $C_{10}H_2O_3SCl_{12}$. An additional object of the invention is a provision of a method for the preparation of the novel compound $C_{10}H_2O_3SCl_{12}$ from hexachlorocyclopentadiene. A still further object of the present invention is the provision of a process for the preparation of the novel insecticide $C_{10}H_2O_3SCl_{12}$ by the reaction of hexachlorocyclopentadiene and chlorosulfonic acid. Other objects of the invention will become apparent hereinafter.

The method of the present invention essentially comprises the reaction of hexachlorocyclopentadiene and chlorosulfonic acid. The reaction may be performed by mixing the reactants at room temperature and heating to the most desirable reaction temperature; by adding the chlorosulfonic acid to the hexachlorocyclopentadiene at a desirable reaction temperature; or by adding hexachlorocyclopentadiene to the chlorosulfonic acid at a desirable reaction temperature. Any suitable manner of admixing the reactants may be employed, and any variation of the above steps is likewise suitable procedure. Agitation of the reaction mixture is preferably employed to ensure satisfactory contact of the reactants, and is desirable for the attainment of highest yields of product.

The temperature range for the reaction between hexachlorocyclopentadiene and chlorosulfonic acid is anywhere between about 30 and 170 degrees centigrade, with the range between about 70 and 120 degrees centigrade being preferred. At temperatures below about 45 degrees centigrade, the reaction rate is quite slow, while at temperatures of about 75 degrees centigrade, a conversion of about 67 per cent may be obtained in a period of 5 hours. At a temperature of about 90 degrees centigrade, a 91 per cent conversion and a 96 per cent yield have been obtained in 2 hours. Although the product may also be obtained in good yield at temperatures of 120 to 130 degrees centigrade, the reaction rate at 85 to 95 degrees centigrade is rapid enough for all practical purposes. The time allowed for the reaction is relatively unimportant, the reaction appearing to be very rapid. Crystals of reaction product usually begin to separate from the mixture of reactants after about the first one-half hour. The reaction may be continued until substantially all of the starting compound, which is introduced into the reaction in the smaller quantity, is converted to the desired product.

Although only approximately 0.77 mole of chlorosulfonic acid appears to be consumed per each mole of hexachlorocyclopentadiene, it is usually advantageous to employ at least about 500 grams, preferably about 1000 grams, of chlorosulfonic acid for every 1000 grams of hexachlorocyclopentadiene, as, in this manner, fluidity of the reaction mixture is conveniently maintained. Thus, the mole ratio of chlorosulfonic acid to hexachlorocyclopentadiene may be varied from 0.77 to 1.0 to several moles of chlorosulfonic acid for each mole of hexachlorocyclopentadiene. However, an excess of the chlorosulfonic acid is usually employed. Other ratios of chlorosulfonic acid and hexachlorocyclopentadiene may be used if desired and, instead of introducing the chlorosulfonic acid directly into the reaction as such, it may be produced in situ.

An inert medium may also be employed for the reaction, although such is not necessary if an excess of chlorosulfonic acid is used. The reaction may be conducted conveniently without the presence of a solvent, and therefore, while a solvent may be employed, such is usually only used when it is desired not to employ an excess of chlorosulfonic acid.

The products of the reaction may be recovered by cooling the thick reaction product, filtering the slurry through a sintered glass funnel to obtain the solid product, washing with water, and then with petroleum ether or other suitable solvent which is saturated with the desired product. For purification purposes, the product may be conveniently recrystallized from petroleum ether, having a boiling range between about 30 and 100 degrees centigrade, or in other conventional manner.

The following examples are given to illustrate the practice of the present invention, but are in no way to be construed as limiting.

Example 1

A mixture of 1000 grams of chlorosulfonic acid and 1000 grams of hexachlorocyclopentadiene was stirred vigorously for 2 hours at 90 degrees centigrade. Red crystals began to separate from the reaction mixture after 0.5 hour. The thick reaction mixture was cooled to 3 degrees centigrade and maintained at that temperature for 2 hours. The slurry was filtered through a sintered glass funnel to obtain the solid product, which was washed with water, and then with 400 milliliters of petroleum ether saturated with $C_{10}H_2O_3SCl_{12}$. The dried product, 987 grams, was a white crystalline solid having a melting range of 143 to 147 degrees centigrade, and having the probable molecular formula $C_{10}H_2O_3SCl_{12}$. From the initial filtrate, 674 grams of chlorosulfonic acid was recovered by distillation. Recrystallization of the organic product from petroleum ether increased the melting point to 146 to 147 degrees centigrade.

Example 2

A mixture of 1000 grams of chlorosulfonic acid and 1000 grams of hexachlorocyclopentadiene was stirred for 5 hours at 75 degrees centigrade. Recovery of the product, performed as described previously, produced 756 grams of white solid, having the probable molecular formula $C_{10}H_2O_3SCl_{12}$.

Properties of $C_{10}H_2O_3SCl_{12}$

This material is an odorless, white, crystalline solid having a melting point of 146 to 147 degrees centigrade. It was found to contain 19.06 per cent carbon, 0.26 per cent hydrogen, 67.8 per cent chlorine, and 5.09 per cent sulfur. Molecular weight determinations gave the values 611 and 639. These data correspond closely to the molecular formula $C_{10}H_2O_3SCl_{12}$, which has the following analysis: C, 19.11; H, 0.32; Cl, 67.8; S, 5.09; M. W., 627. The product is soluble in common organic solvents, a saturated solution in petroleum ether (90–100 degrees centigrade) containing approximately 6 per cent of $C_{10}H_2O_3SCl_{12}$. It contains chlorine active toward silver nitrate and various alkaline reagents. For example, alcoholic alkali converts it to a water-soluble salt, which, upon acidification, forms a white crystalline acid having a very marked tendency to form a gel with water. This acid contains about 70 per cent chlorine, no sulfur, and has the property of subliming without melting at 740 millimeters of mercury pressure. The acid was converted to a compound containing nitrogen, and about 60 per cent chlorine by reaction with diethylamine. The nitrogen-containing product does not have a sharp melting point, but decomposes gradually at temperatures about about 160 degrees centigrade. The compound, $C_{10}H_2O_3SCl_{12}$, also undergoes reactions with alcohols, such as methyl and ethyl alcohol and also with the following reagents to produce products as described:

| Reagent | Properties of Product |
|---|---|
| (a) Potassium iodide | White solid, sublimes without melting. Contains about 70 per cent chlorine, no sulfur. |
| (b) Diethylamine | White solid. Decomposes above 160 degrees centigrade. Contains nitrogen, about 61 per cent chlorine, no sulfur. |
| (c) Aluminum Chloride | White solid. Sublimes without melting. Contains 76 per cent chlorine, no sulfur. |
| (d) Application of heat to effect a distillation. | Hexachlorocyclopentadiene, chlorosulfonic acid, sulfur oxides, and the dimer of hexachlorocyclopentadiene. |

The compound $C_{10}H_2O_3SCl_{12}$ is highly effective in 0.5 per cent concentrations against the milkweed bug and the sweet potato weevil, producing 100 per cent kills in 48 hours. It has also shown activity against German roaches and aphids. The material has been formulated as a wettable dust, as an emulsion, and in solutions of the solvents commonly used for formulating insecticides. At concentrations of 1:800, this insecticide has shown 0 per cent injury to greenhouse cucumbers, tomatoes, and beans.

The following is a tabulation of screening results on the new compound, conveniently referred to as JN-63:

Screening tests on JN-63

| Comparison with High Gamma $C_6H_6Cl_6$ | Actual Concentration | Milkweed Bug | Percent Mortality at 48 hours | |
|---|---|---|---|---|
| | | | Sweet Potato Weevil | Sweet Potato Weevil Sprayed |
| 100..0..27 | 4:800, 0.5% | 100 | 100 | 100 |
| 60..5..5 | 2:800, 0.25% | 100 | 87 | 56 |
| 7..5..5 | 1:800, 0.13% | 94 | 73 | 73 |
| 0..0..0 | 1:1600, 0.06% | 56 | 53 | 56 |
| | 1:3200, 0.03% | 46 | 15 | 0 |
| | 1:6400, 0.015% | 20 | 0 | 0 |

| Formulation | Actual Concentration | Insect used | Mortality at 48 hours |
|---|---|---|---|
| As a wettable dust | 1:800 | Milkweed Bug | 100 |
| Do | 1:800 | German Roaches | 20 |
| Do | 1:800 | Sweet Potato Weevil Sprayed. | 73 |
| Do | 1:800 | Sweet Potato Weevil placed on sprayed potato. | 73 |
| Do | 1:1600 | Milkweed Bug | 90 |
| As an emulsion | 1:400 | do | 100 |
| Do | 1:800 | do | 100 |
| Do | 1:400 | Sweet Potato Weevil | 94 |
| Do | 1:800 | do | 93 |

JN-63 shows activity against aphids on celery plants at concentrations of 1:400 and 1:800.

Various modifications may be made in the method of the present invention without departing from the spirit or scope thereof, and it is to be understood that we limit ourselves only as defined in the appended claims.

We claim:

1. The process which includes: mixing together hexachlorocyclopentadiene and chlorosulfonic acid at a temperature above about room temperature, to cause reaction between the hexachlorocyclopentadiene and the chlorosulfonic acid.

2. The process of claim 1, wherein the reaction is conducted at a temperature between about 30 and about 170 degrees centigrade.

3. The process of claim 1, wherein the reaction is conducted at a temperature between about 70 and about 120 degrees centigrade.

4. The process of claim 1, wherein an excess of chlorosulfonic acid is employed.

5. The process of claim 1, wherein the product of the approximate composition $C_{10}H_2O_3SCl_{12}$ is separated from the reaction product.

6. A compound of the approximate molecular formula $C_{10}H_2O_3SCl_{12}$, having a melting point, in the solid state, of about 146 to 147 degrees centigrade, being substantially identical with the product formed by the reaction of chlorosulfonic acid with hexachlorocyclopentadiene and having valuable insecticidal properties.

7. A compound, having a melting point, in the solid state, of approximately 146 to 147 degrees centigrade, formed by the reaction of hexachlorocyclopentadiene and chlorosulfonic acid.

EARL T. McBEE.
   JACK S. NEWCOMER.

REFERENCES CITED

The following references are of record in the file of this patent:

UNITED STATES PATENTS

| Number | Name | Date |
|---|---|---|
| 2,046,090 | Reed | June 30, 1936 |
| 2,148,928 | Meuron | Feb. 28, 1939 |
| 2,240,920 | Werntz | May 6, 1941 |
| 2,337,552 | Henke | Dec. 28, 1943 |
| 2,382,038 | Bruson | Aug. 14, 1945 |

FOREIGN PATENTS

| Number | Country | Date |
|---|---|---|
| 582,205 | Great Britain | 1946 |